(12) United States Patent
Huang

(10) Patent No.: US 8,832,905 B2
(45) Date of Patent: Sep. 16, 2014

(54) UNIVERSAL FAUCET HANDLE STRUCTURE

(75) Inventor: Li-Chen Huang, Changhua Hsien (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 32 days.

(21) Appl. No.: 13/092,149

(22) Filed: Apr. 22, 2011

(65) Prior Publication Data

US 2012/0266410 A1    Oct. 25, 2012

(51) Int. Cl.
*F16K 31/60* (2006.01)
*E03C 1/04* (2006.01)

(52) U.S. Cl.
CPC ..................... *F16K 31/60* (2013.01)
USPC ............. 16/422; 16/110.1; 137/315.15

(58) Field of Classification Search
CPC ........... B25G 3/04; B25G 3/32; F16K 31/60; F16K 31/605; E03C 1/01; E03C 1/0412
USPC ........ 137/315.15; 403/383, 361; 16/422, 430, 16/110.1
See application file for complete search history.

(56) References Cited

U.S. PATENT DOCUMENTS

| 1,741,588 | A | * | 12/1929 | Schneider | 403/255 |
| 1,823,496 | A | * | 9/1931 | Lehnert | 403/268 |
| 2,290,249 | A | * | 7/1942 | Piperoux | 428/67 |
| 2,921,326 | A | * | 1/1960 | Lautmann | 15/145 |
| 3,043,330 | A | * | 7/1962 | Young | 137/359 |
| 3,301,580 | A | * | 1/1967 | Greitzer | 403/23 |
| 3,582,116 | A | * | 6/1971 | Young | 403/359.1 |
| 3,994,608 | A | * | 11/1976 | Swiderski et al. | 403/372 |
| 4,616,673 | A | * | 10/1986 | Bondar | 137/315.15 |
| 4,794,945 | A | * | 1/1989 | Reback | 137/315.12 |
| 4,796,329 | A | * | 1/1989 | Bory | 16/441 |
| 4,842,009 | A | * | 6/1989 | Reback | 137/315.15 |
| 4,876,766 | A | * | 10/1989 | Cohen | 16/426 |
| 5,711,511 | A | * | 1/1998 | Cynar | 251/293 |
| 6,317,923 | B1 | * | 11/2001 | Lo | 16/110.1 |
| 6,438,797 | B1 | * | 8/2002 | Thomas | 16/110.1 |
| 6,533,049 | B1 | * | 3/2003 | Rein et al. | 175/320 |
| D602,124 | S | * | 10/2009 | Jones | D23/245 |
| 8,006,350 | B2 | * | 8/2011 | Chen | 16/422 |

* cited by examiner

*Primary Examiner* — Emily Morgan
(74) *Attorney, Agent, or Firm* — Che-Yang Chen; Law Office of Michael Chen

(57) ABSTRACT

A universal faucet handle structure has: a handle body having an assembling portion with a through aperture, the through aperture having a non-circular cross-sectional shape, the through aperture providing a combining member; the assembling portion having an assembling slot adjacent to the through aperture, the assembling slot having a non-circular cross-sectional shape; and a joint sleeve having two connecting ends, both of the connecting ends capable of being connected to the assembling slot of the handle body; each connecting end having an engaging slot; the engaging slot having a non-circular cross-sectional shape; the engaging slot having an axial hole, and each connecting end further having an engaging groove. With the above-mentioned embodiment, following benefit can be obtained: since the assembling slot of the handle body is connected to the joint sleeve, the handle can be assembled onto different types of the faucet shafts.

5 Claims, 8 Drawing Sheets

UNIVERSAL FAUCET HANDLE STRUCTURE

BACKGROUND OF THE INVENTION

1. Field of the Invention

The present invention relates to a universal faucet handle structure, and more particularly to a faucet handle that can be connected to different types of faucet shafts.

2. Description of the Related Art

Different people prefer faucets with different styles. Moreover, many like to do home improvements by themselves. However, different faucets have control shafts with differing cross-sectional shapes and dimensions, and so the consumer needs to select a matching faucet handle, which can be very inconvenient.

Therefore, it is desirable to provide a universal faucet handle structure to mitigate and/or obviate the aforementioned problems.

SUMMARY OF THE INVENTION

An objective of the present invention is to provide a universal faucet handle structure.

In order to achieve the above-mentioned objective, a universal faucet handle structure is disclosed.

A universal faucet handle structure comprises: a handle body having an assembling portion with a through aperture, the through aperture having a non-circular cross-sectional shape, the through aperture providing a combining member, the assembling portion having an assembling slot adjacent to the through aperture, the assembling slot having a non-circular cross-sectional shape; and a joint sleeve having two connecting ends, both of the connecting ends capable of being connected to the assembling slot of the handle body, each connecting end having an engaging slot, the engaging slot having a non-circular cross-sectional shape, the engaging slot having an axial hole, each connecting end further having an engaging groove, the engaging groove having a non-circular cross-sectional shape, the dimensions of the cross-sectional shape of the engaging groove being different from the dimensions of the cross-sectional shape of the engaging slot.

With the above-mentioned embodiment, the following benefit can be obtained: since the assembling slot of the handle body is connected to the joint sleeve, the handle can be assembled onto different types of faucet shafts.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
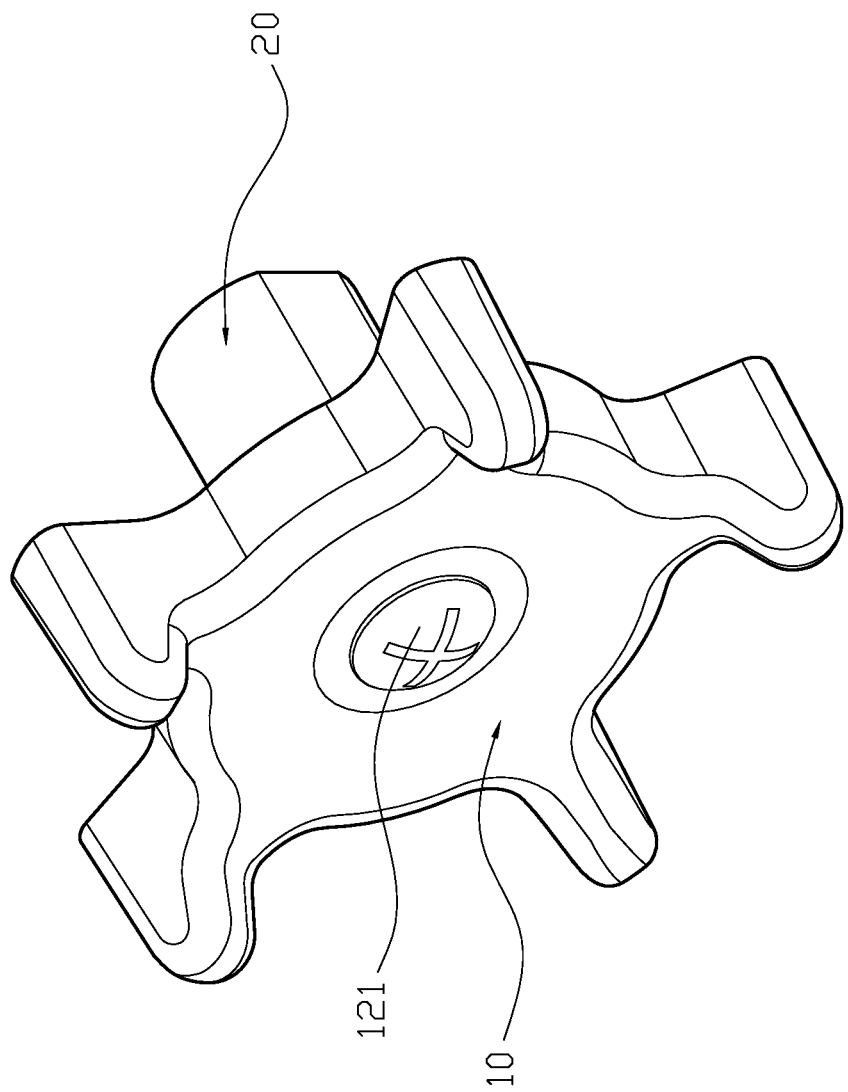
FIG. 1 is a perspective view of an embodiment of the present invention.
Figure 2:
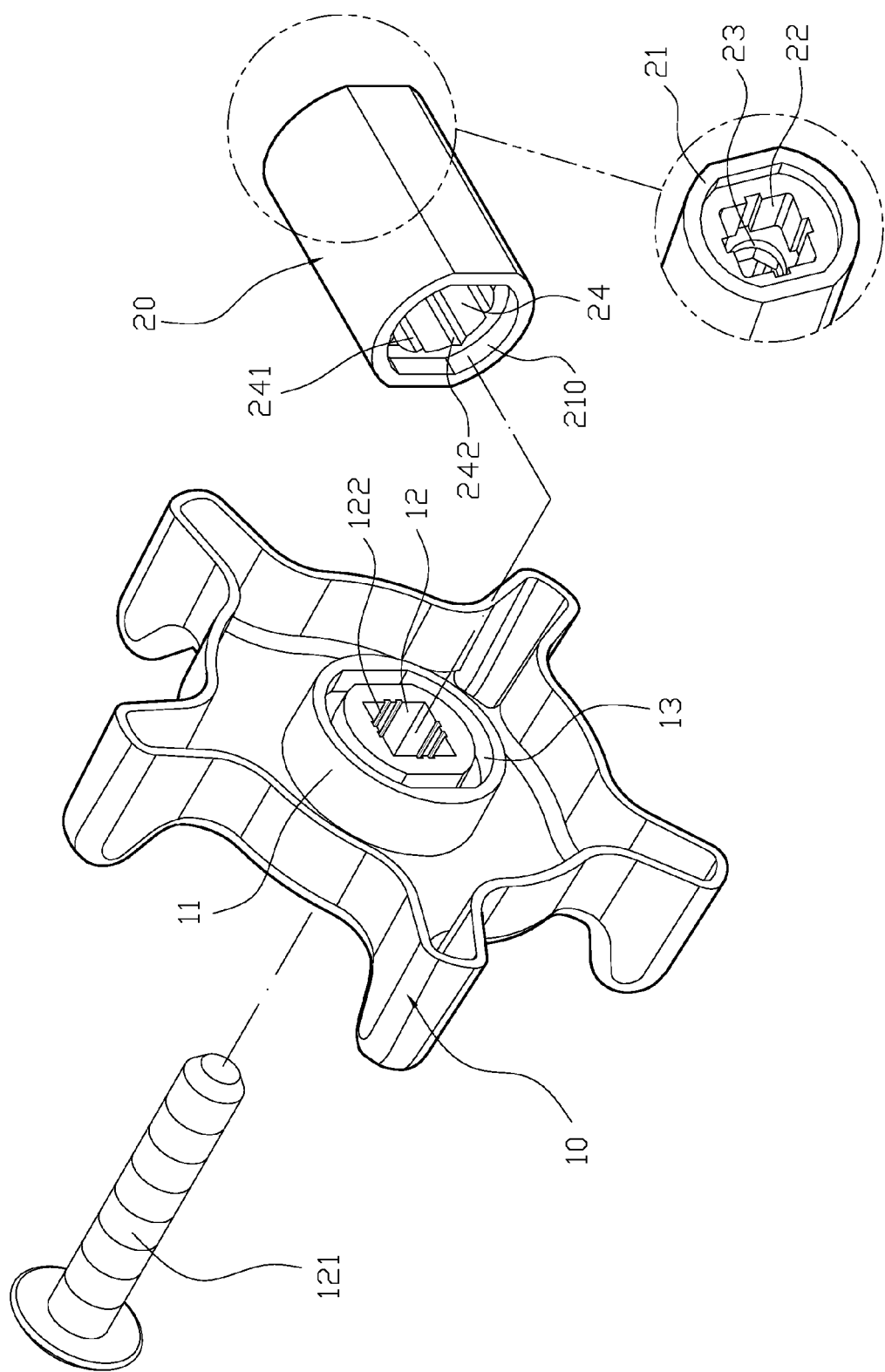
FIG. 2 is a perspective exploded view of an embodiment of the present invention.
Figure 3:
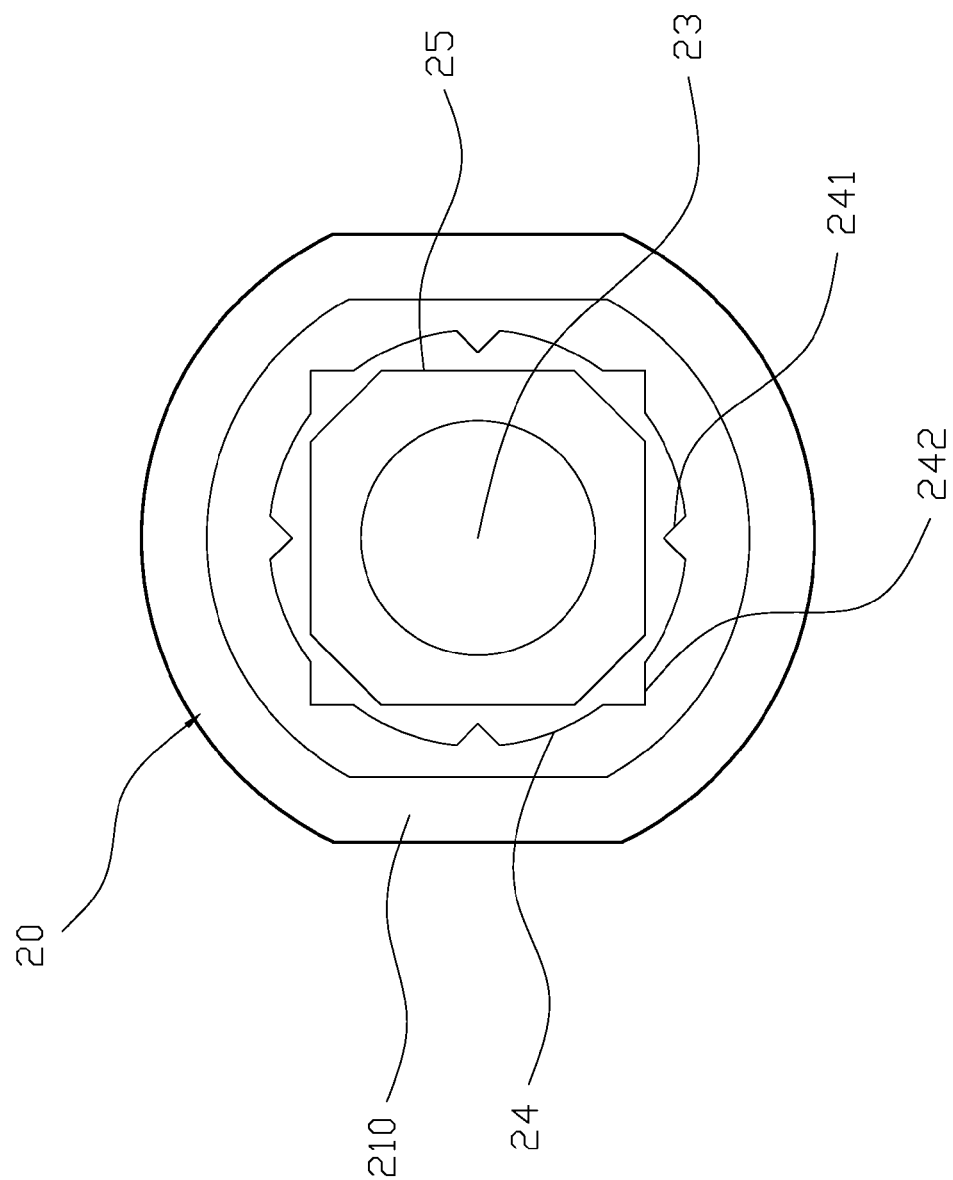
FIG. 3 is a planar schematic view of a joint sleeve according to an embodiment of the present invention.

Please refer to FIG. 1 and FIG. 2. A universal faucet handle structure comprises a handle body 10 and a joint sleeve 20. The handle body 10 has an assembling portion 11 with a through aperture 12, and the through aperture 12 has a non-circular cross-sectional shape and accepts a combining member 121. The combining member 121 can be a screw or nut. The through aperture 12 further has a plurality of anti-slip slots 122. The assembling portion 11 has an assembling slot 13 adjacent to the through aperture 12, and the assembling slot 13 has a non-circular cross-sectional shape. The joint sleeve 20 has two connecting ends 212, and both of the connecting ends 212 are capable of being connected to the assembling slot 13 of the handle body 10. One connecting end 21 has an engaging slot 22, and the engaging slot 22 has a non-circular cross-sectional shape such as a rectangular shape. The engaging slot 22 has an axial hole 23, and the other connecting end has an engaging groove 24. The engaging groove 24 has a non-circular cross-sectional shape, and the dimension of the cross-sectional shape of the engaging groove 24 is larger than the dimension of the cross-sectional shape of the engaging slot 22. The engaging groove 24 further has a plurality of positioning teeth 241 and a plurality of positioning grooves 242. The engaging groove 24 further has an engaging recess 25, and the engaging recess 25 has a polygonal cross-sectional shape, as shown in FIG. 3.

Figure 4:
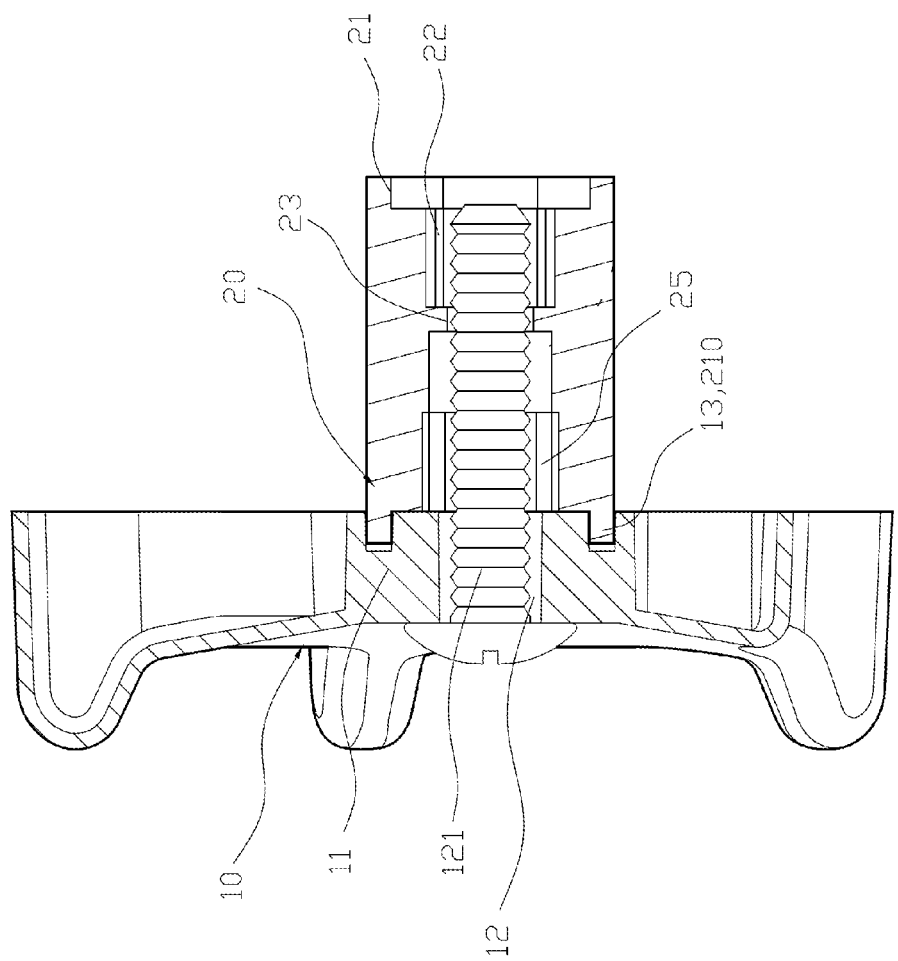
FIG. 4 is a cross-sectional view of an embodiment of the present invention.

For assembly, please refer to FIG. 4. One of the connecting ends 210 of the joint sleeve 20 is disposed in the assembling slot 13 of the handle body 10, and another connecting end 21 of the joint sleeve 20 is thus connected to the assembling slot 13 of the handle body 10.

Figure 5:
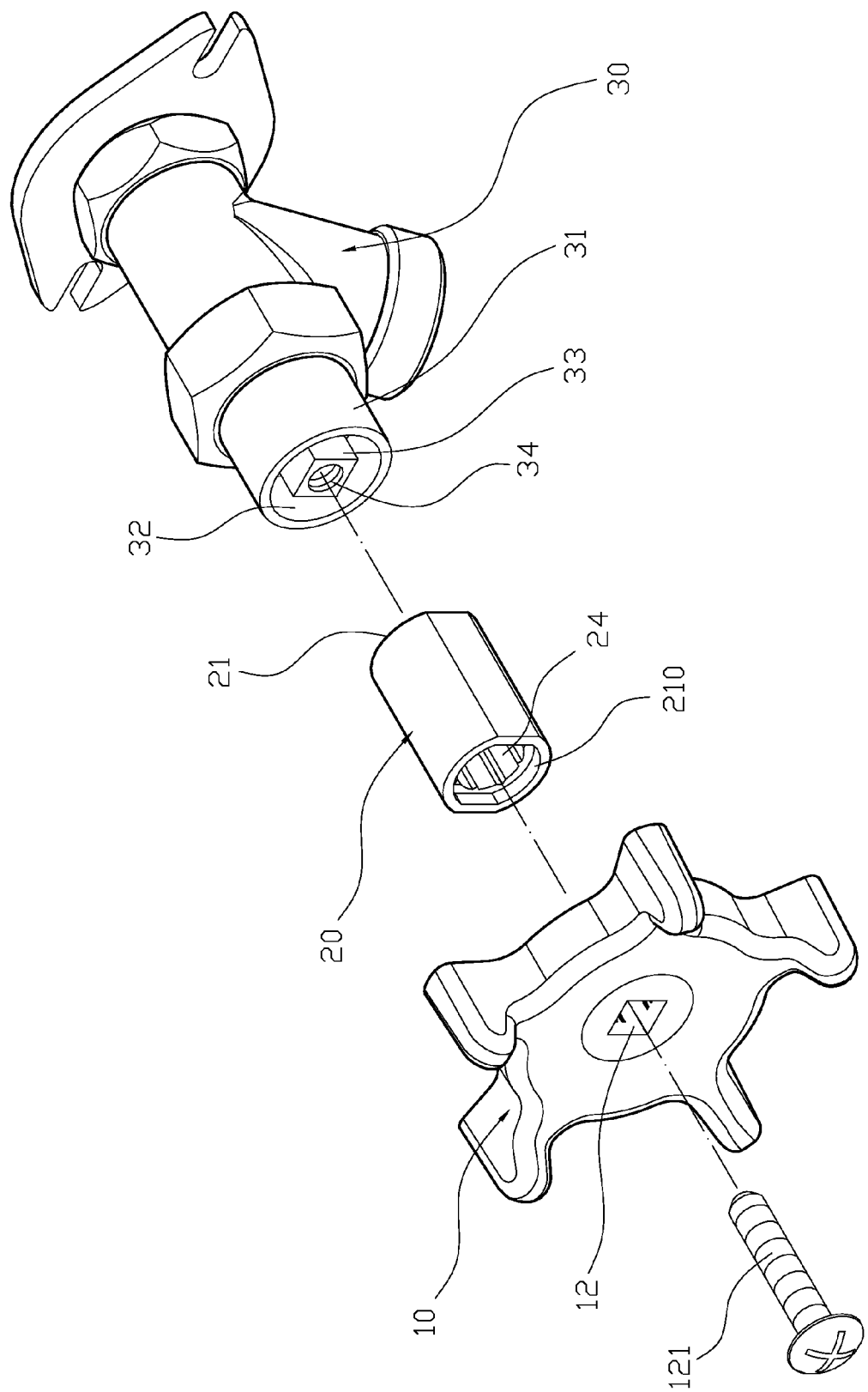
FIG. 5 is a perspective exploded view of an embodiment being combined with a faucet according to the present invention.
Figure 6:
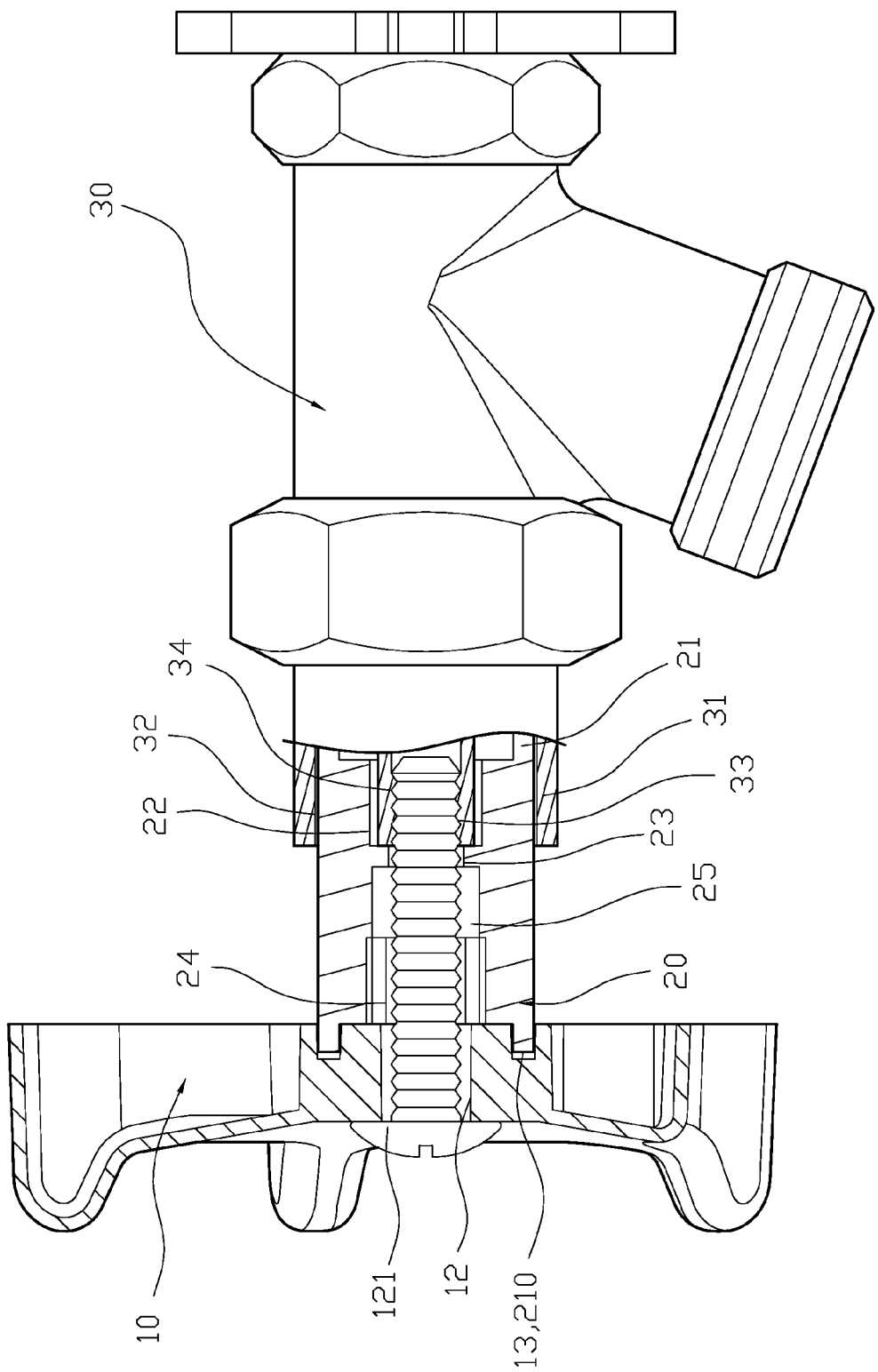
FIG. 6 is a cross-sectional view of a faucet in an embodiment of the present invention.

For actual operations, please refer to FIG. 5. The handle is attached onto a faucet 30. The faucet 30 has an assembling portion 31. The assembling portion 31 has a groove 32, and the groove 32 has a control shaft 33. The control shaft 33 has a non-circular cross-sectional shape such as a rectangular shape, and the control shaft 33 has an assembly aperture 34. When the handle needs to be assembled onto the faucet 30, the connecting end 21 of the joint sleeve 20 is inserted into the groove 32 of the faucet 30 such that the engaging slot 22 of the joint sleeve 20 jackets onto the control shaft 33. Since the engaging slot 22 has a non-circular cross-sectional shape, it can be engaged with the control shaft 33. The combining member 121 is passed through the through aperture 12 of the handle body 10 and secured with the assembly aperture 34 of the control shaft 33, which finishes the assembly process. Please refer to FIG. 6, if the control shaft 33 and the engaging slot 22 have different cross-sectional shapes and sizes, the joint sleeve 20 can be turned around to use another connecting end 210 for connecting to the assembling slot 13 of the handle body 10. Since another connecting end 210 of the joint sleeve 20 has an engaging groove 24 with a larger cross-sectional area, the engaging groove 24 has a plurality of positioning teeth 241 and a plurality of positioning grooves 242, the engaging groove 24 further has an engaging recess 25 with a polygonal cross-sectional shape, as shown in FIG. 3, the joint sleeve 20 can be attached to control shafts 33 having various cross-sectional shapes and dimensions.

Figure 7:
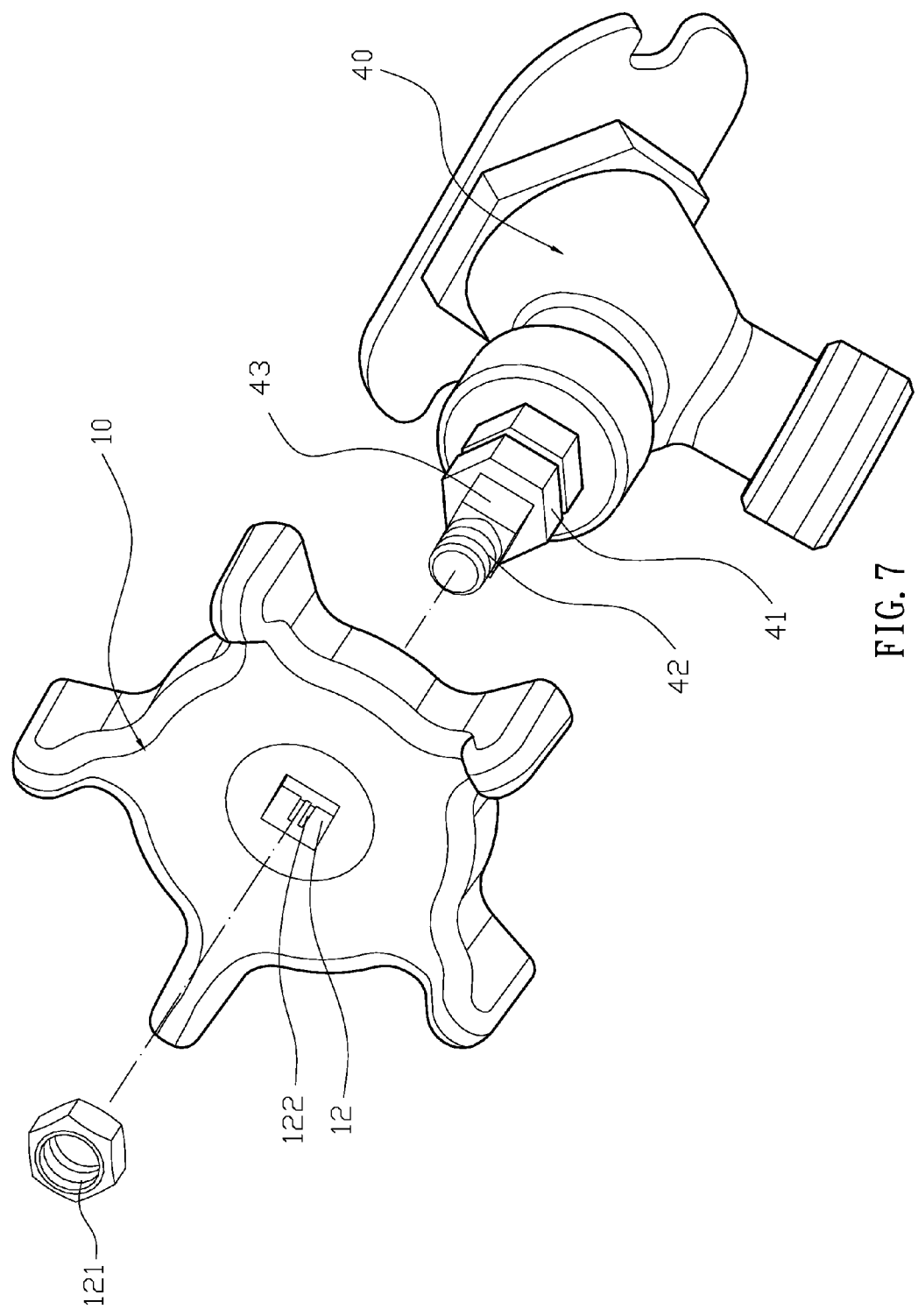
FIG. 7 is a perspective exploded view of another faucet in an embodiment of the present invention.
Figure 8:
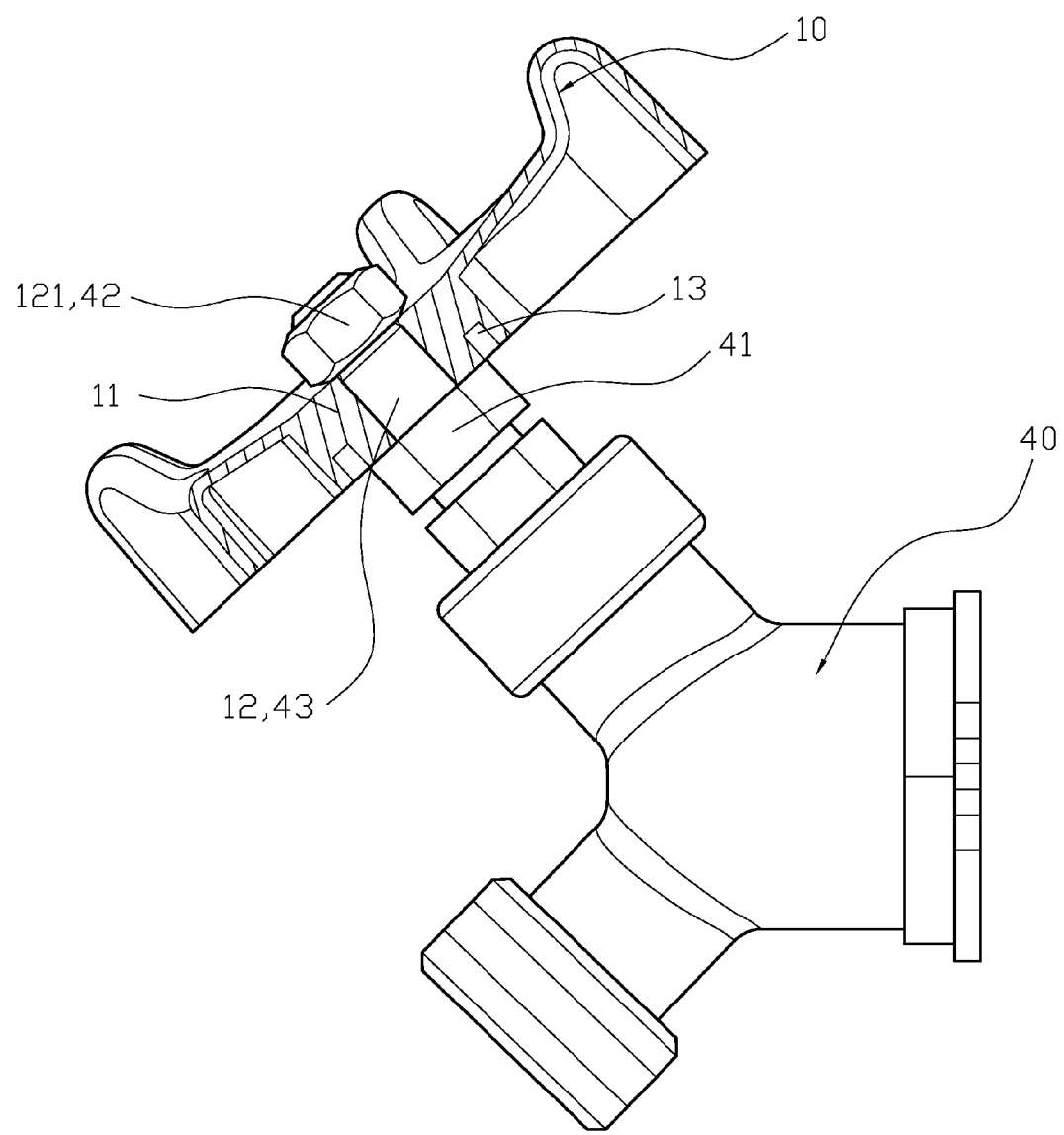
FIG. 8 is a cross-sectional view of another faucet in an embodiment of the present invention.

Please refer to FIG. 7 with FIG. 4. The handle can also be assembled onto another type of the faucet 40. The faucet 40 comprises a control shaft 41, and the control shaft 41 has a connecting portion 42 and an engaging portion 43. The engaging portion 43 has a non-circular cross-sectional shape. When the handle needs to be assembled with another type of the faucet 40, the joint sleeve 20 is disassembled, and the handle body 10 is jacketed onto the control shaft 41 of another faucet 40. The through aperture 12 of the handle body 10 has a non-circular cross-sectional shape, which can engage with the engaging portion 43 of the control shaft 41, and the combining member 121 is secured with the connecting portion 42 of the control shaft 41, as shown in to FIG. 8.

With the above-mentioned embodiment, the following benefit can be obtained: since the assembling slot 13 of the handle body 10 is connected to the joint sleeve 20, the handle can be assembled onto different types of the faucet shafts.

Although the present invention has been explained in relation to its preferred embodiment, it is to be understood that many other possible modifications and variations can be made without departing from the spirit and scope of the invention as hereinafter claimed.

What is claimed is:

1. A universal faucet handle structure comprising:
   a handle body having an assembling portion with a through aperture, the through aperture having sidewalls defining a non-circular cross-sectional shape, the through aperture accepting a combining member, the assembling portion having an assembling groove defined by lateral sidewalls concentric with an end portion of the sidewalls of the through aperture, the assembling groove having a non-circular cross-sectional shape; and
   a joint sleeve having an inner surface, an outer surface and two connecting ends, both of the connecting ends shaped for mating engagement with the assembling groove of the handle body, the inner surface is formed by a first engaging portion at one of the connecting ends, a second engaging portion at the other of the connecting ends, and an axial hole there between, the first engaging portion having a non-circular cross-sectional shape, the second engaging portion having a different non-circular cross-sectional shape, and the axial hole has a diameter smaller than either of the cross sectional shapes of the first and second engaging portions,
   wherein the second engaging portion includes a plurality of positioning teeth and a plurality of positioning grooves,
   wherein the first and second engaging portions are configured to engage control stems of different shapes.

2. The universal faucet handle structure as claimed in claim 1, wherein the through aperture has a rectangular cross-sectional shape.

3. The universal faucet handle structure as claimed in claim 1, wherein the through aperture further has a plurality of anti-slip slots.

4. The universal faucet handle structure as claimed in claim 1, wherein the combining member is a screw or bolt.

5. The universal faucet handle structure as claimed in claim 1, wherein the first engaging portion has a rectangular cross-sectional shape.

* * * * *